United States Patent
Bradford et al.

(10) Patent No.: US 8,295,181 B2
(45) Date of Patent: Oct. 23, 2012

(54) TRANSFER OF NETWORK TRAFFIC FOR MULTI-HOMED DEVICES

(75) Inventors: Richard W. Bradford, Westford, MA (US); Daniel J. Biagini, Waltham, MA (US); Adam L. Taylor, Acton, MA (US)

(73) Assignee: Cisco Technology, Inc., San Jose, CA (US)

(*) Notice: Subject to any disclaimer, the term of this patent is extended or adjusted under 35 U.S.C. 154(b) by 377 days.

(21) Appl. No.: 12/414,425

(22) Filed: Mar. 30, 2009

(65) Prior Publication Data

US 2010/0246404 A1    Sep. 30, 2010

(51) Int. Cl.
*H04L 12/28* (2006.01)
*G06F 15/16* (2006.01)

(52) U.S. Cl. ......... 370/236; 370/237; 709/235; 709/239

(58) Field of Classification Search .......... 709/223–226, 709/230–235, 239; 370/216–228, 230.1, 370/232–237
See application file for complete search history.

(56) References Cited

U.S. PATENT DOCUMENTS

| | | | |
|---|---|---|---|
| 5,959,968 A * | 9/1999 | Chin et al. | 370/216 |
| 6,910,149 B2 * | 6/2005 | Perloff et al. | 714/4.3 |
| 7,171,287 B2 * | 1/2007 | Weiss | 700/291 |
| 7,535,825 B1 * | 5/2009 | Callon | 370/216 |
| 7,567,512 B1 * | 7/2009 | Minei et al. | 370/232 |
| 7,801,857 B2 * | 9/2010 | Betts et al. | 707/628 |
| 7,877,503 B2 * | 1/2011 | Solis et al. | 709/232 |
| 2008/0181196 A1 * | 7/2008 | Regan et al. | 370/351 |
| 2008/0219207 A1 * | 9/2008 | Chen et al. | 370/328 |
| 2009/0245112 A1 * | 10/2009 | Okazaki | 370/236 |
| 2010/0046526 A1 * | 2/2010 | Kompella | 370/395.53 |

* cited by examiner

*Primary Examiner* — Habte Mered
(74) *Attorney, Agent, or Firm* — Schwegman, Lundberg & Woessner, P.A.

(57) ABSTRACT

In an embodiment, a method is provided for transferring network traffic for multi-homed devices. In this method, capacity information is received from a network device. This capacity information identifies a network capacity of the network device. Upon detection of network traffic to exceed a threshold, an excess capacity of the network device is identified based on the capacity information. A portion of the network traffic is then transferred to the network device by way of a link aggregation protocol, and the portion of network traffic is transferred based on the identified excess capacity of the network device.

17 Claims, 8 Drawing Sheets

TRANSFER OF NETWORK TRAFFIC FOR MULTI-HOMED DEVICES

FIELD

The present disclosure relates generally to computer networks. In an embodiment, the disclosure relates to the transfer of network traffic for multi-homed devices.

BACKGROUND

In networking, link aggregation generally refers to combining multiple communication links into a single, logical communication link. In a typical service provider network that uses link aggregation, many link aggregation sessions may be setup to provide dual-homing for customers where each customer device is connected to a network by way of two independent access points. For delivery of customer data to the service provider network, the access points must have sufficient bandwidth to the service provider's core network. In typical link aggregation, a network device will only transition its active communication links to another network device when all of its communication links to a core network have failed. However, if all the active communication links to the core network have not failed, transition does not occur in link aggregation because there is still some connectivity. This limitation can severely limit customer traffic to the core network.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

A method is provided for transferring network traffic for multi-homed devices. In this method, capacity information is received from a network device. This capacity information identifies a network capacity of the network device. Upon detection of network traffic to exceed a threshold, an excess capacity of the network device is identified based on the capacity information. A portion of the network traffic is then transferred to the network device by way of a link aggregation protocol, and the portion of network traffic is transferred based on the identified excess capacity of the network device.

Example Embodiments

Figure 1:
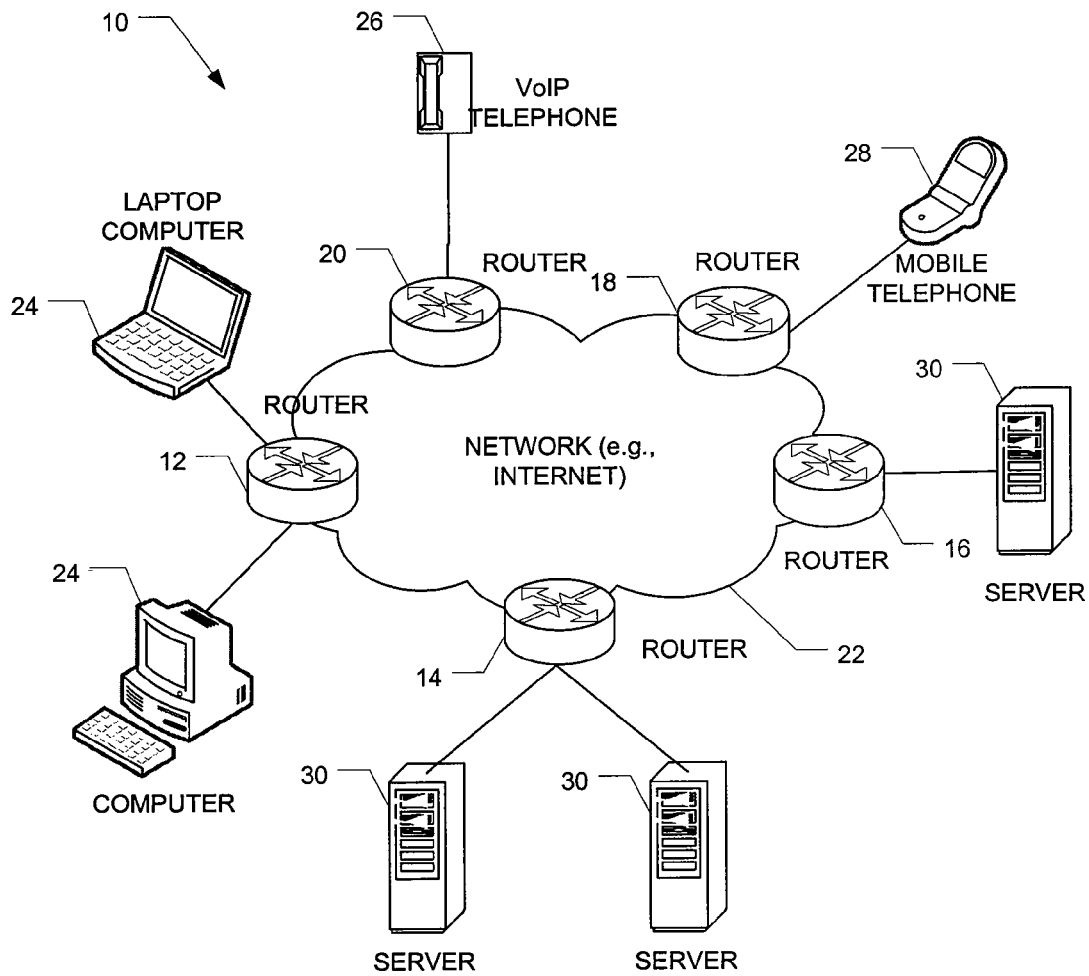
FIG. 1 depicts a diagram of an example of a networked system.

FIG. 1 depicts a diagram of an example of a networked system 10. This network system 10 includes various network endpoints (e.g., network nodes) embodied as network devices, which receive digital data for processing and communication to other network devices. As depicted in FIG. 1, network devices including computers 24, Voice-over-IP (VoIP) telephone 26, mobile telephone 28, servers 30, and routing devices 12, 14, 16, 18 and 20. The routing devices 12-20 forward and route data packets along network 22, and examples of the routing devices 12-20 include routers and switches. It will be appreciated that any number of routing devices 12-20 may be provided in the network system 10. The routing devices 12-20 are shown to be connected by way of the network 22, which may include one or more Local Area Networks (LANs) and/or Wide Area Networks (WANs), such as the Internet.

In the network system 10, data is communicated, for example, by way of Internet Protocol (IP) packets or datagrams using a variety of suitable upper-layer transport communication protocols. For example, packets may be encapsulated and communicated using Transmission Control Protocol (TCP)/Hypertext Transport Protocol (HTTP) and User Datagram Protocol (UDP) protocol. The packets or datagrams are carried over data links, which can be controlled using a link aggregation protocol, which is described in more detail below. As explained in more detail below, the embodiments of the invention described herein may be deployed in a variety of network devices, such as routing devices 12-20.

Figure 2:
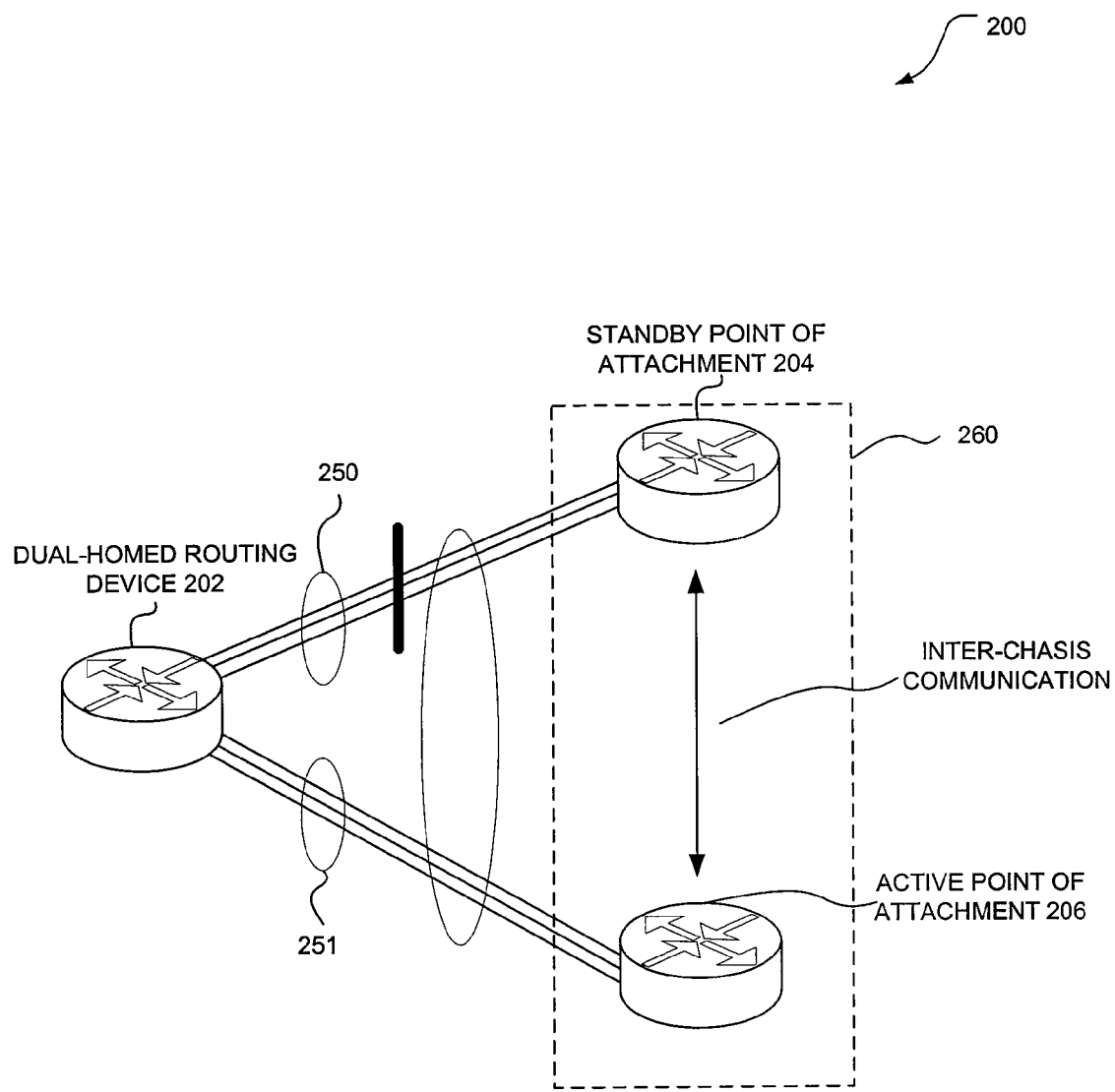
FIG. 2 depicts a diagram of another example of a network system, in accordance with an illustrative embodiment, utilizing link aggregation.

FIG. 2 depicts a diagram of another example of a network system 200, in accordance with an illustrative embodiment, utilizing link aggregation. The network system 200 includes a dual-homed routing device 202 linked with routing devices 204 and 206. It should be appreciated that multi-homing is a network topology in which a network device is connected to the network by way of two or more independent access points (or points of attachment). Therefore, a dual-homed device is a network device connected to a network by way of two independent access points. A triple-homed device is a network device connected to a network by way of three independent access points. The communication links 250 and 251 to the routing devices 204 and 206, respectively, are aggregated or bundled. In general, link aggregation refers to combining multiple communication links (e.g., communication links 250 or 251) into a single, logical communication link. That is, a set of multiple, parallel communication links between two network devices can be grouped together to form a single logical link. As depicted in FIG. 2, the multiple communication links 250 to the routing device 204 are aggregated into a single, logical communication link. Similarly, the multiple communication links 251 to the routing device 206 are aggregated into another single, logical communication link.

Aggregating the communication links 250 and 251 increases the capacity and availability of the communication channels between network devices (e.g., routing devices 202, 204, and 206) using, for example, Fast Ethernet and Gigabit Ethernet technology. For example, two or more Gigabit Ethernet connections may be aggregated or combined together to increase the bandwidth capability and to create resilient and redundant links. If one communication link in the bundled communications links 250 fails, then the network traffic carried by that communication link can be transferred to other communication links within the same bundled communication links 250, if available, in order to maintain network connectivity.

A "link aggregation protocol" is a protocol to control the aggregation or bundling of several physical communication links together to form a single logical channel. The link aggregation protocol, for example, allows a routing device to negotiate an automatic aggregation of communication links by sending link aggregation packets to its peers that also run the same link aggregation protocol. In another example, link aggregation protocol allows a multi-homed device to receive control information from a network device, which causes the multi-homed device to switch its network traffic from the links on one access node to links on a different access node. An example of a link aggregation protocol is a Link Aggregation Control Protocol (LACP), which is a protocol that controls the bundling of several physical ports together to form a single logical channel. Another example of a link aggregation protocol is multi-chassis LACP (mLACP), which extends the concept LACP such that one end of LACP is further split between two or more network devices, such as routing devices 204 and 206. Generally, multi-chassis LACP protocol is a protocol for multi-homing connections to a network. For example, as depicted in FIG. 2, the bundled communication links 250 and 251 to separate routing devices 204 and 206, respectively, can be further aggregated into a single logical channel. Here, the routing devices 204 and 206 are in communication with each other by way of inter-chassis communication and are grouped as a single redundancy group 260, which refers to groupings of network devices (e.g., routing devices 204 and 206) in link aggregation. Inter-chassis communication may utilize, for example, TCP, Label Distribution Protocol (LDP), Border Gateway Protocol (BGP), Inter-Control Center Communications Protocol (ICCP), or other protocols.

Multi-chassis LACP thus provides, for example, redundant Ethernet access connectivity that extends beyond link level protection by allowing two or more network devices to share a common end point. As illustrated in FIG. 2, multi-chassis LACP allows one of the bundled communication links 250 or 251 to serve as a backup link by managing the bundled communication links 250 and 251 in "active" and "standby" modes such that only one of the bundled communication links 250 or 251 is active at a time. Here, the communication links 251 are actively passing network traffic while the communication links 250 are in standby. If the communication links 251 fail, then the communication links 250 can take over the network traffic, thereby maintaining network connectivity. As discussed in more detail below, the communication links 250 and 251 can also be aggregated to provide load balancing where the processing and communication activity are distributed across several redundancy groups such that no single bundle of communication links is overwhelmed.

Figure 3:
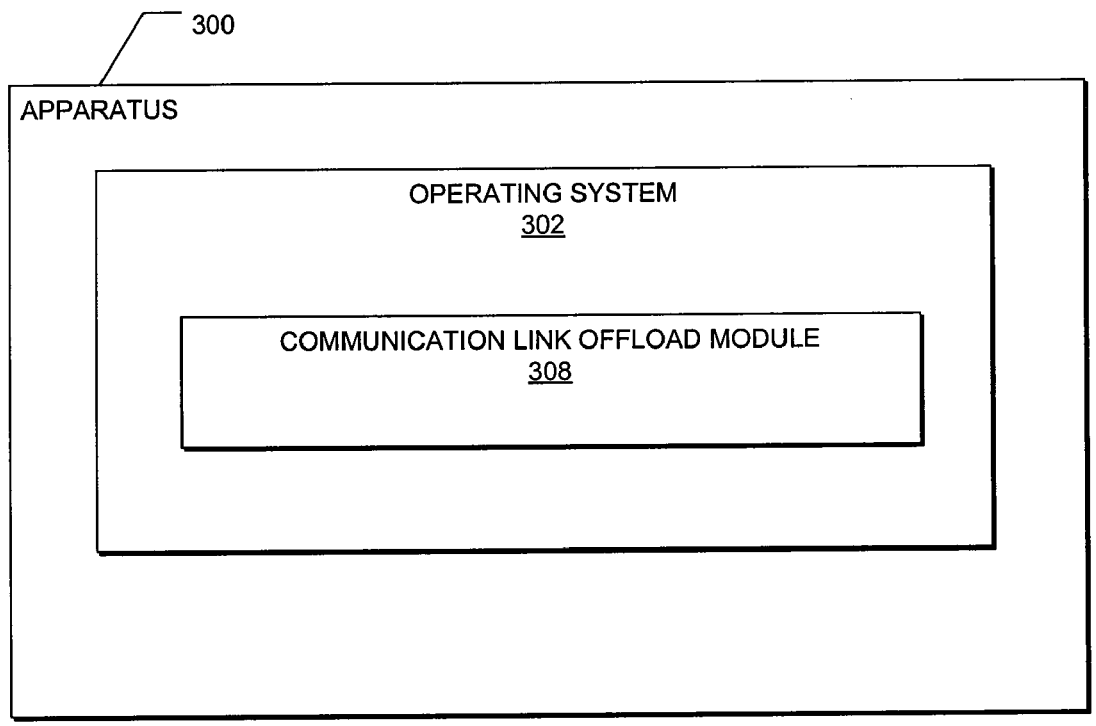
FIG. 3 depicts a block diagram of a communication link offload module, in accordance with an embodiment, included in an apparatus.

FIG. 3 depicts a block diagram of a communication link offload module 308, in accordance with an embodiment, included in an apparatus 300. It should be appreciated that the apparatus 300 may be deployed in the form of a variety of network devices, such as the routing devices 204 and 206 depicted in FIG. 2. In various embodiments, the apparatus 300 may be used to implement computer programs, logic, applications, methods, processes, or other software to transfer a portion of network traffic by way of link aggregation protocol, as described in more detail below.

The apparatus 300 includes an operating system 302 (e.g., an Internetworking Operating System) that manages the software processes and/or services executing on the apparatus 300. As depicted in FIG. 3, these software processes and/or services may include a communication link offload module 308. As explained in more detail below, the communication link offload module 308 is configured to transfer a portion of the network traffic to another network device within the same redundancy group upon failure of a communication link or to provide load balancing.

Figure 4:
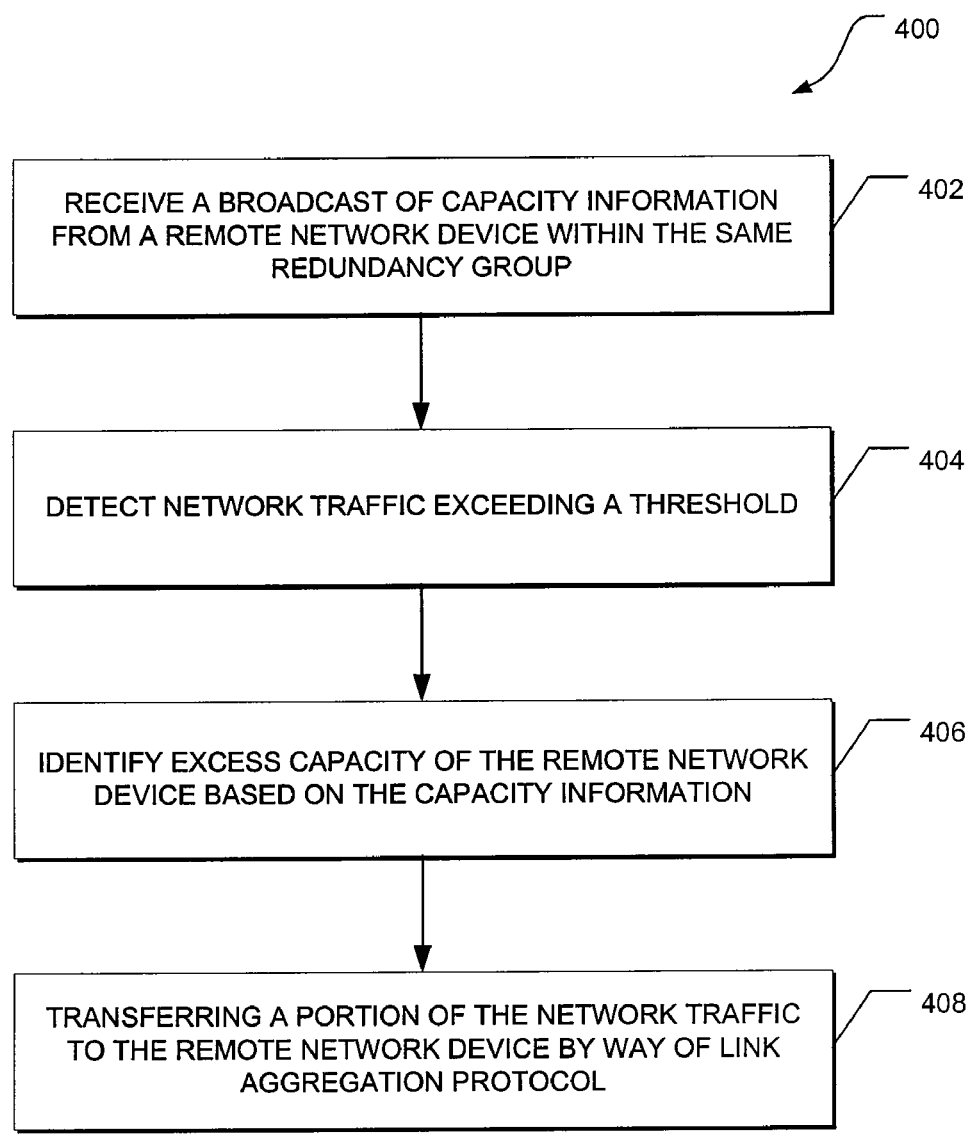
FIG. 4 depicts a flow diagram of a general overview of a method, in accordance with an embodiment, for transferring portions of network traffic by way of link aggregation protocol.

FIG. 4 depicts a flow diagram of a general overview of a method 400, in accordance with an embodiment, for transferring portions of network traffic by way of link aggregation protocol. In an embodiment, the method 400 may be implemented by the communication link offload module 308 and employed in the apparatus 300 of FIG. 3. Starting at 402, a broadcast of capacity information from a remote network device (e.g., a peer network device) within the same redundancy group is received by way of inter-chassis communication. As used herein, "capacity information," refers to any information related to a capacity of a network device to handle network traffic. For example, this capacity information may identify a network capacity of a remote network device's interfaces and amount in use. In particular, the capacity information may include an available capacity, which is the total capacity of a network device to handle network traffic. In another example, capacity information can also include used capacity, which is the capacity of network traffic being used. In yet another example, the capacity information may include excess capacity, which can be expressed as:

Excess Capacity=Available Capacity−Used Capacity

The available, used, and excess capacities may be expressed as bandwidth, a number of communication links, identifiers that identify particular communication links, or other information that can be used to derive the capacity of a network device.

At the same time, the apparatus also monitors its own network capacity and the amount in use. In an example, local network traffic is detected to exceed a certain threshold at 404. A "threshold," as used herein, is a predefined value defining an upper limit of network traffic. The available capacity, for example, may be used as a threshold value. The network traffic can exceed a threshold based on a loss of connectivity along a communication link. For example, a failure of a communication link can cause network traffic to exceed the available capacity of a network device. In addition to link failures, a large amount of network traffic transmitted to a network device can also cause the threshold to be exceeded.

Still referring to FIG. 4, upon detection of the threshold being exceeded, the excess capacity of the remote network device is then identified at 406 based on the capacity information received from the remote network device. If the received capacity information already includes the excess capacity, then the excess capacity can be directly identified from the received capacity information. On the other hand, the capacity information may not include the excess capacity, but include other capacity information that may be used to derive the excess capacity. For example, the capacity information received may include an available capacity and a used capacity of the remote network device. The excess capacity is identified or calculated by subtracting the used capacity from the available capacity. In another example, the capacity information may include a number of used communication links. Since the available bandwidth of each communication link is predefined, the excess capacity can be expressed as:

Excess Capacity=(NAvailable−NUsed)*Bandwidth where "NAvailable" is the total number of available links in a bundle, "NUsed" is the number of used communication links, and "Bandwidth" is the predefined or fixed bandwidth of each communication link.

After the excess capacity of the remote network device is identified, a portion of the network traffic is transferred to the remote network device at 408 by way of link aggregation protocol. The transfer of the portion of network traffic is based on the excess capacity. That is, for example, the excess capacity can set the limit on the amount of network traffic that can be transferred. As an example, if the remote network device has an excess capacity of one Gbps (gigabyte/second), then the portion of network traffic transferred to the remote network device cannot exceed one Gbps. As will be explained in more detail below, a variety of different techniques in link aggregation protocol may be used to transfer the portion of the network traffic. As a result, where many peer network devices provide access to many multi-homed devices, embodiments of the invention can be used to optimize a core bandwidth available to the multi-homed devices, which is explained in more detail below.

Figure 5:
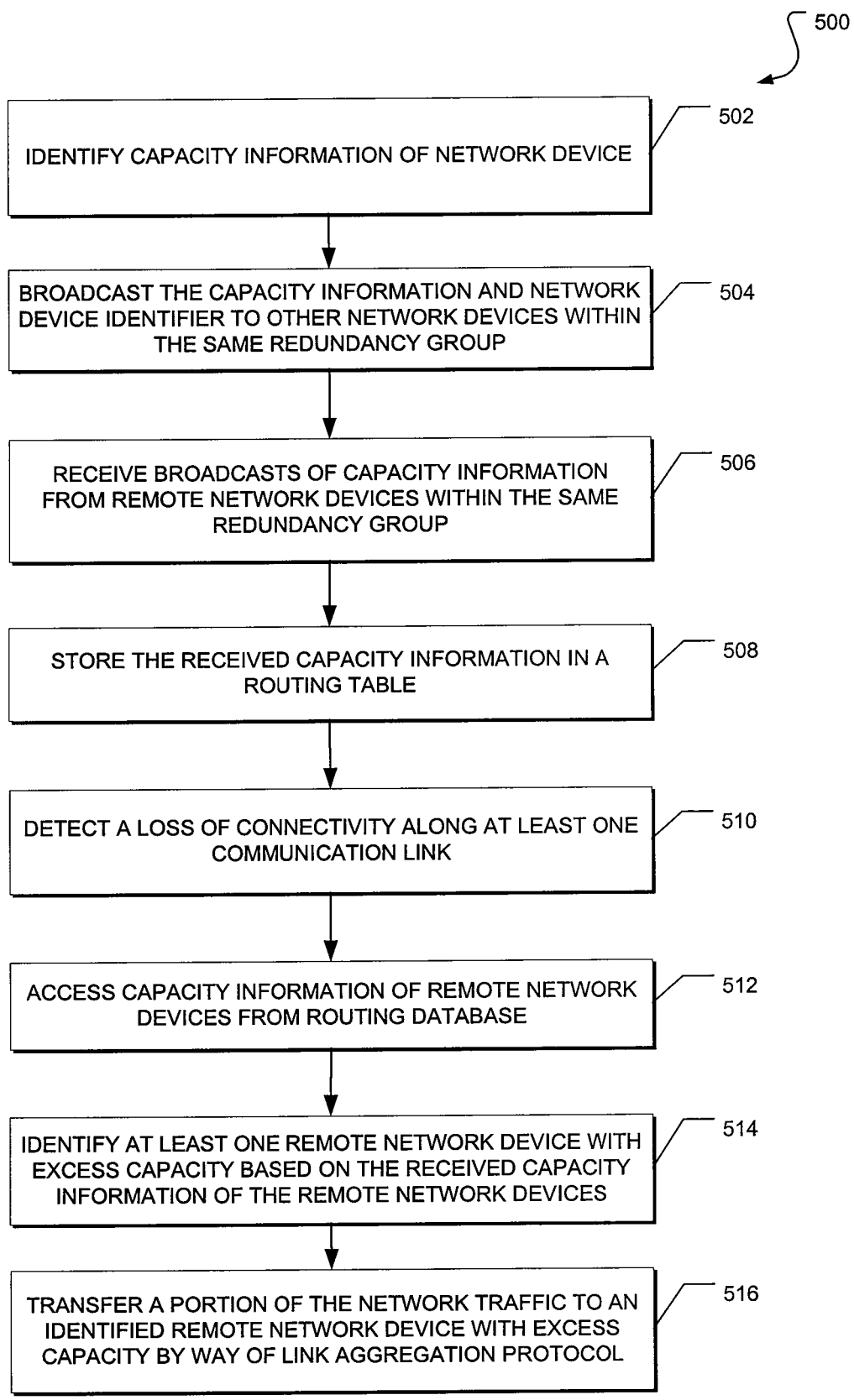
FIG. 5 depicts a flow diagram of a detailed method, in accordance with an alternate embodiment, of transferring a portion of network traffic by way of link aggregation protocol.

FIG. 5 depicts a flow diagram of a detailed method 500, in accordance with an alternate embodiment, of transferring a portion of network traffic by way of link aggregation protocol. Starting at 502, a network device identifies its capacity to handle network traffic and advertises or broadcasts this capacity information at 504 to other network devices within the same redundancy group. For example, the routing device may identify its excess capacity to handle additional network traffic, which is derived from its used capacity, and may include the excess capacity in the broadcast. In another example, the routing device may identify its available capacity and/or used capacity and may include this capacity information in the broadcast.

In addition to the capacity information, the network device may also include its identifier in the broadcast such that other remote network devices can identify the origin of the capacity information. An "identifier," as used herein, refers to a value (numeric and/or textual) that uniquely identifies a network device. The broadcast may be made by way of inter-chassis communication between network devices and such broadcast may be transmitted periodically or every time when there is a change in capacity.

At the same time, broadcasts of capacity information and network device identifiers from other remote network devices within the same redundancy group are received at 506. In effect, all the network devices within the same redundancy group exchange capacity information such that each network device is updated on the capacities of every other network device within the same redundancy group. The network device may then store the received capacity information and identifiers in a routing database at 508, which might also include other information such as forwarding information, Routing Information Base (RIB) information, and other information.

During this time, the network device may detect a complete or partial loss of connectivity along at least one communication link at 510. Upon detection of the loss of connectivity, the network device accesses the capacity information of other remote routing devices from the routing database at 512 and identifies at least one remote network device with excess capacity to handle additional network traffic at 514. Based on the identification, the network device then transfers a portion of the network traffic that was previously handled by the failed communication link to the identified remote network device with excess capacity at 516 by way of link aggregation protocol. As explained in more detail below, the network device may transfer the portion of the network traffic by placing the failed communication link in standby mode or by having other remote network devices reroute the network traffic to the designated network device with excess capacity.

Figure 6:
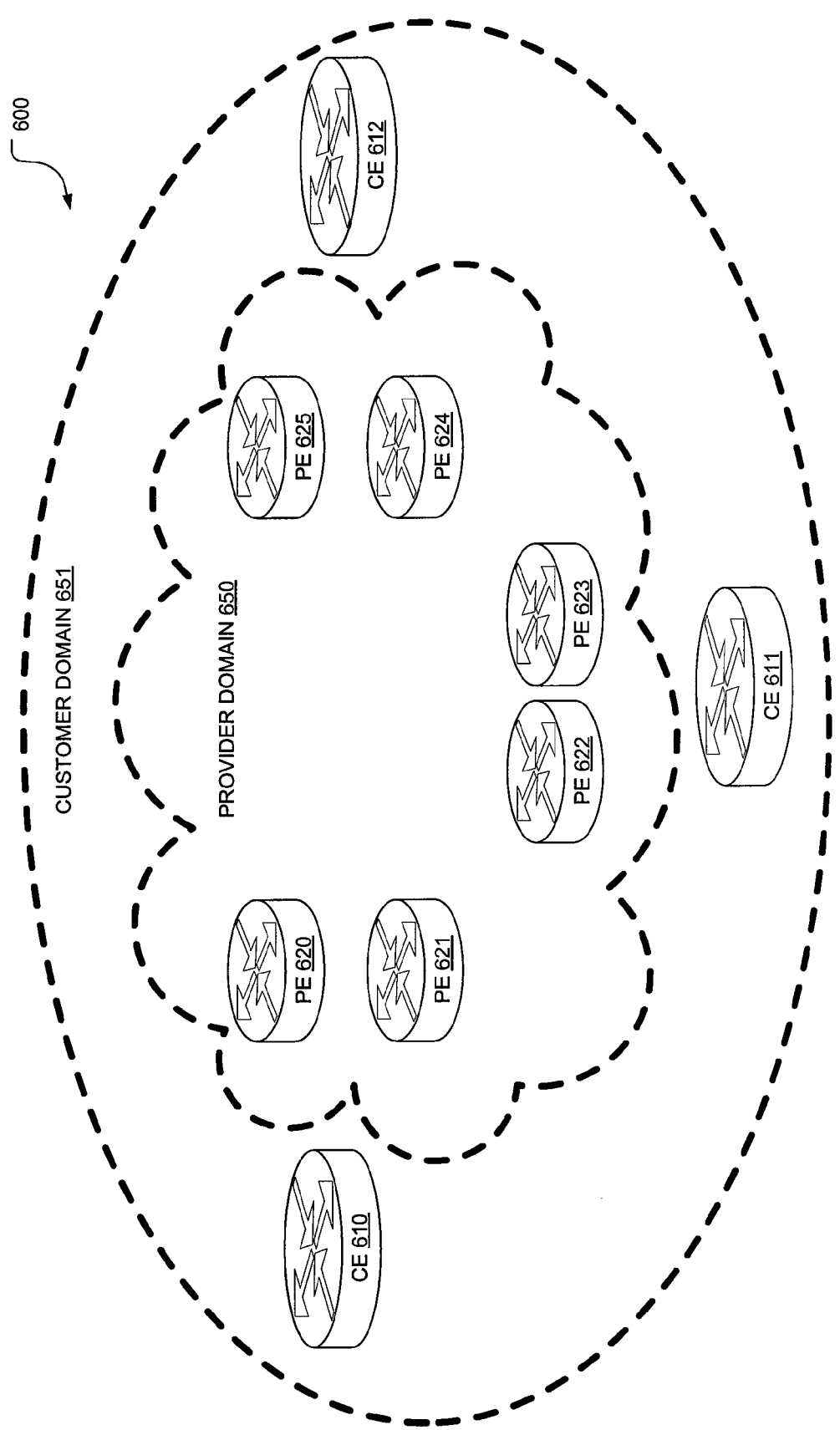
FIG. 6 depicts a diagram of an example of a computer network with customer and provider edge routers.

FIG. 6 depicts a diagram of an example of a computer network 600 with customer and provider edge routers 610-612 and 620-625. This computer network 600 includes a provider domain 650 and a customer domain 651 that are interconnected by routing devices 610-612 and 620-625. A domain (e.g., the provider domain 650 or the customer domain 651) is a collection of network nodes under the control of one or more entities that present a common routing policy. The domain may also be referred to as an autonomous system or community. It should be noted that a number of network nodes (e.g., routing devices 610-612 and 620-625) and communication links may be used in the computer network 600, and that the computer network 600 depicted in FIG. 6 shown herein is for simplicity.

A network administrator can assign a unique maintenance level to each domain 650 or 651. It should be noted that levels and domain names are useful for defining the hierarchical relationship that exists among domains 650 and 651. As depicted in FIG. 6, the hierarchical relationship of domains 650 and 651 parallels the structure of a customer and a service provider, with the designation of a "customer" domain 651 and a "provider" domain 650, respectively. It should be noted that the provider domain 650 may also be referred to as a core network. The distinct networks within domains 650 and 651 can be coupled together by inter-domain routing devices 610-112 and 620-625 that are configured to communicate by way of routing protocols. A provider edge (PE) routing device (e.g., PE routing device 620, 621, 622, 623, 624, or 625) is an example of an inter-domain routing device. The PE routing device can be placed at the edge of an Internet service provider (ISP) network, and may communicate by way of a routing protocol to another PE routing device or domain. A customer edge (CE) routing device (CE routing device 610, 611, or 612) is another example of an inter-domain routing device. The CE routing device can be located at the edge of a network associated with a customer or subscriber, and the CE routing device may communicate by way of a routing protocol to other routing devices internal or external to its domain.

Figure 7:
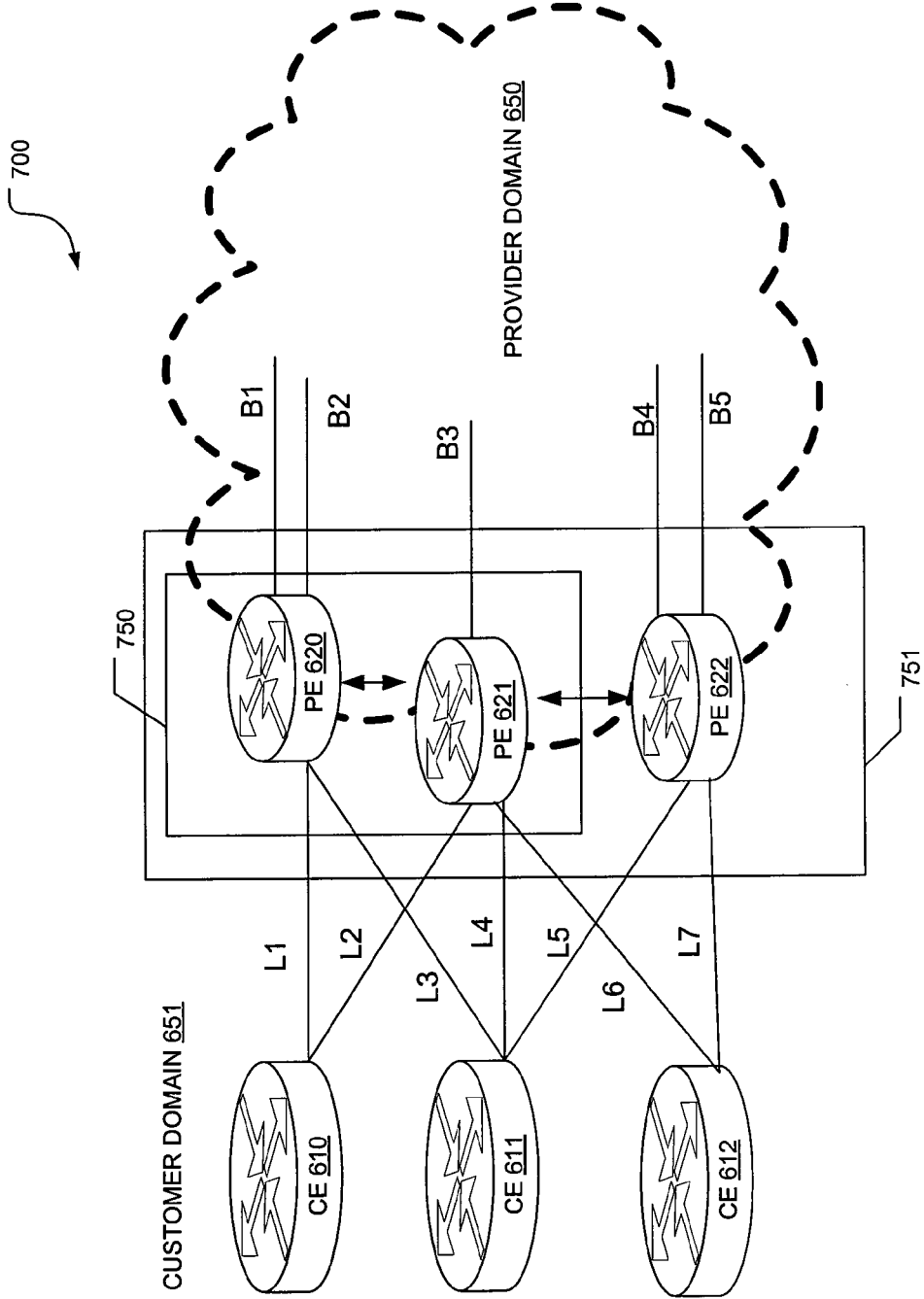
FIG. 7 depicts a diagram illustrating the transfer of a portion of network traffic between customer and provider edge routing devices by way of link aggregation protocol, in accordance with an embodiment.

FIG. 7 depicts a diagram illustrating the transfer of a portion of network traffic between customer and provider edge routing devices 610-612 and 620-622, respectively, by way of link aggregation protocol, in accordance with an embodiment. The computer network 700 depicted in FIG. 7 includes a provider domain 650 and a customer domain 651, which are described above, that are interconnected by customer edge and provider edge routing devices 610-612 and 620-622. As depicted, the provider edge routing devices 620-622 are connected to the provider domain 651 by way of communication links B1-B5. The customer edge routing device 610 is dual-homed to provider edge routing devices 620 and 621 along communication links L1 and L2. The customer edge routing device 611 is triple-homed to provider edge routing devices 620, 621, and 622 along communication links L3, L4, and L5. Finally, the customer edge routing device 612 is dual-homed to provider edge routing devices 621 and 622 along communication links L6 and L7. The provider edge routing devices 620 and 621 are grouped into a redundancy group 750 while the provider edge routing devices 620, 621, and 622 are grouped into a second redundancy group 751.

Multi-chassis LACP operates between each customer edge routing device 610, 611, or 612 and its connected provider edge routing devices 620, 621, and/or 622. The three provider edge routing devices 620-622 are in communication with each other by way of inter-chassis redundancy protocol, such as Inter-Chassis Communications Protocol (ICCP). The provider edge routing devices 620-622 exchange capacity information with each other in the same redundancy group 750 or 751 by way of inter-chassis redundancy protocol. For example, the provider edge routing device 620 broadcasts to provider edge routing device 621, which is within the same redundancy group 750, its capacity information. This provider edge routing device 620 can also broadcast its capacity information to provider edge routing device 622 because the provider edge routing device 620 also belongs to redundancy group 751.

In the example of FIG. 7, each communication link B1, B2, B4, or B5 can handle one Gbps of network traffic while communication link B3 can handle two Gbps of network traffic. The customer edge routing devices 610 and 611 are sending a total of two Gbps of data to provider edge routing device 620, which is fully utilizing communication links B1 and B2. The customer edge routing device 612 is sending all its data at the rate of one Gbps to provider edge routing device 621. The provider edge routing device 622 therefore is not utilized, with no data being sent to communication links B4 and B5.

If communication link B1 fails, connectivity to the provider domain 650 is still present on communication link B2, but half the network traffic from customer edge routing devices 610 and 611 can be lost. If a threshold of one Gbps is used to fail-over the communication links L1-L7, and network traffic to provider edge routing device 620 exceeds this threshold because communication link B1 failed, then the provider edge routing device 620 can transfer a portion of the network traffic to the provider edge routing device 621 and/or provider edge routing device 622 based on their capacity.

In an example, the provider edge routing device 620 may identify from the capacity information broadcast from the provider edge routing device 621 that the provider edge routing device 621 has an excess capacity of one Gbps to handle additional network traffic. As a result, the provider edge routing device 620 transfers a portion of network traffic (one Gbps) to the provider edge routing device 621. Alternatively, since the provider edge routing device 620 also belongs to the redundancy group 751, the provider edge routing device 620 can also transfer a portion of the network traffic to the provider edge routing device 622 because the provider edge routing device 622 has two communication links B4 and B5, which is not being used, with a total excess capacity of two Gbps.

The provider edge routing device 620 can transfer a portion of the network traffic using a variety of different techniques by way of link aggregation protocol. In an embodiment, the provider edge routing device 620 can place the communication link L1 in standby mode by raising its port priority value, which is a priority assigned to a port in link aggregation protocol. As a result of the communication link L1 being placed in standby mode, the excess network traffic of one Gbps from, for example, customer edge routing device 610 is transferred or routed to the provider edge routing device 621.

Alternatively, instead of directly placing the failed communication link L1 in standby mode, the other provider edge routing devices 621 and 622 can learn of the decreased available capacity of the provider edge routing device 620 from the exchange of capacity information, and either or both the provider edge routing devices 621 and 622 can change (increase or decrease) their own port priority values such that a portion of the traffic to the provider edge routing device 620 is transferred to the provider edge routing device 621 and/or provider edge routing device 622.

In another embodiment, portions of network traffic may be transferred without failures of communication links B1-B5. Instead, the capacity information exchanged between the provider edge routing devices 620-622 can be used for preemptive load balancing. For example, the threshold for each provider edge routing device 620, 621, or 622 may be defined not to exceed one Gbps. If there are more than one Gbps of network traffic to any one provider edge routing device 620, 621, or 622, then the additional network traffic are transferred or distributed among each other routing devices 620, 621, and/or 622. As a result, a further transfer of portions of network traffic is not necessary if, for example, communication link B1 or B2 fails unless the provider edge routing device 620 completely lost its backbone connection to the provider domain 650.

In yet another embodiment, a network device may not only advertise its excess capacity, but may also advertise a requested capacity of itself and/or the requested capacity of a neighbor network device. For example, the provider edge routing devices 620 and 621 are peers, the provider routing devices 621 and 622 are peers, and the provider edge routing device 622 and another provider edge routing device D (not depicted in FIG. 7) are peers. Provider edge routing device 620 has excess capacity of one Gbps, but provider edge routing devices 621 and 622 have no excess capacity. Also, the provider edge routing device D has a request for 1 Gbps of bandwidth and thereby advertises a request of one Gbps to its peer provider edge routing device 622. Here, the provider edge routing device 622 does not have any spare capacity. However, the provider edge routing device 622 determines that if it could shift some network traffic to the provider edge routing device 621, then it could have enough capacity to take on additional network traffic from the provider edge routing device D. The provider edge routing device 622 therefore advertises a request for one Gbps to provider edge routing device 621. This provider edge routing device 621, which has information about the excess capacity of provider edge routing device 620, would then shift one Gbps of network traffic to provider edge routing device 620 by shifting one or more communication links to provider edge routing device 620 using the earlier described mechanisms with link aggregation protocol. Once this is accomplished, the provider edge routing device 621 could advertise its excess capacity. The provider edge routing device 622 would then repeat this process to shift network traffic to provider edge routing device 621 and finally, the provider edge network device D would shift its excess network traffic of 1 Gps to provider edge routing device 622.

Figure 8:
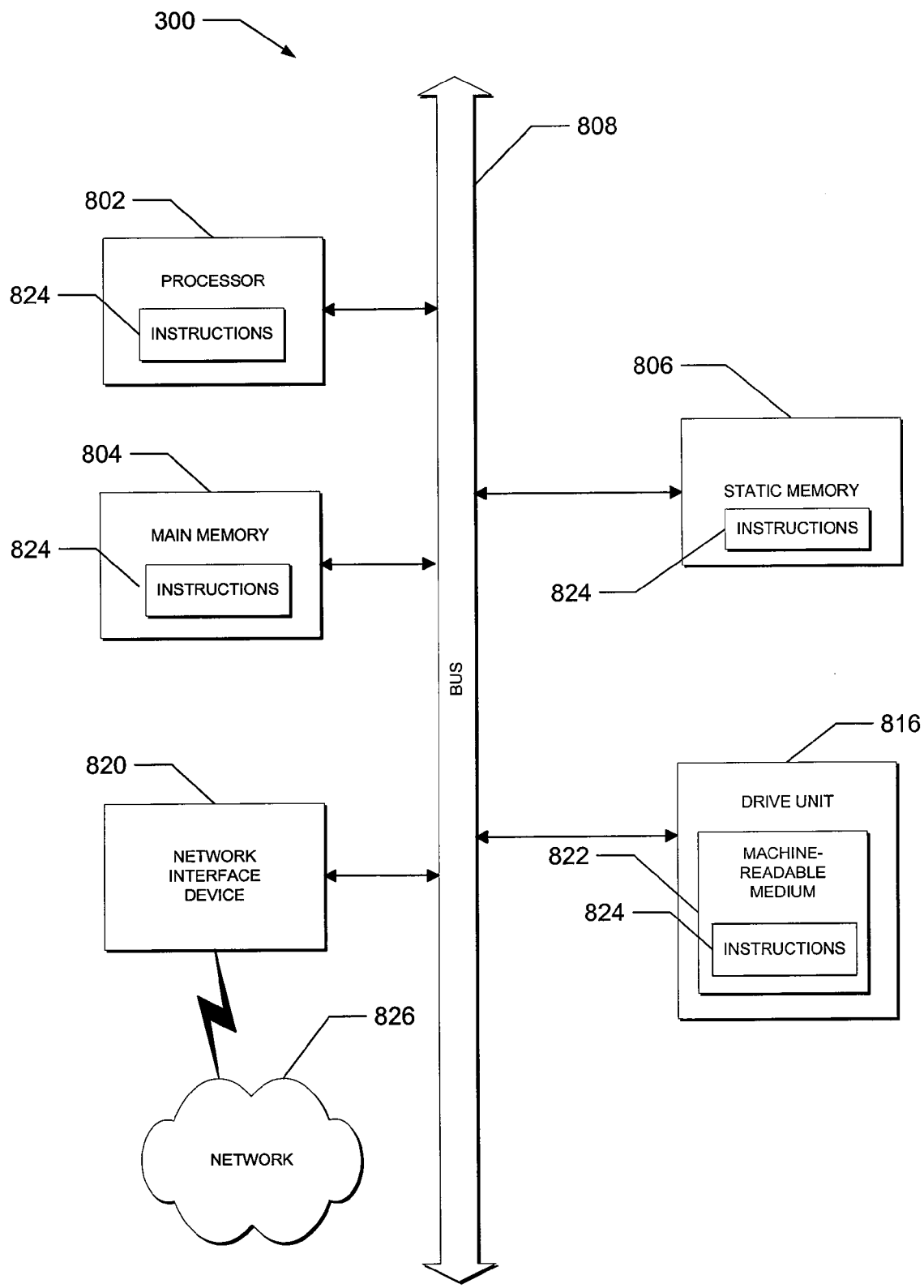
FIG. 8 is a simplified block diagram of a machine in the example form of an apparatus within which a set of instructions, for causing the machine to perform any one or more of the methodologies discussed herein, may be executed.

FIG. 8 is a simplified block diagram of a machine in the example form of an apparatus 300 within which a set of instructions, for causing the machine to perform any one or more of the methodologies discussed herein, may be executed. In alternative embodiments, the machine may be connected (e.g., networked) to other machines. The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example apparatus 300 includes a processor 802 (e.g., a central processing unit (CPU)), a main memory 804, and a static memory 806, which communicate with each other via bus 808. The apparatus 300 may also include a disk drive unit 816 and a network interface device 820.

The disk drive unit 816 includes machine-readable medium 822 on which is stored one or more sets of instructions and data structures 824 (e.g., software) embodying or utilized by any one or more of the methodologies or functions described herein. The instructions may also reside, completely or at least partially, within the main memory 804 and/or within the processor 802 during execution thereof by the apparatus 300, with the main memory 804 and the processor 802 also constituting machine-readable, tangible media. The instructions 824 may further be transmitted or received over network 826 via network interface device 820 utilizing any one of a number of well-known transfer protocols.

While machine-readable medium 822 is shown in an embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for transfer of network traffic via link aggregation protocol may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method comprising:
   receiving capacity information from a network device, the capacity information identifying a network capacity of the network device;
   detecting network traffic exceeding a threshold;
   identifying an excess capacity of the network device based on the capacity information;
   transferring a portion of the network traffic to the network device by way of a link aggregation protocol, the portion of the network traffic being transferred based on the excess capacity;
   identifying an available capacity to handle additional network traffic; and
   broadcasting the available capacity to the network device by way of an Inter-Chassis Communication Protocol (ICCP).

2. The method of claim 1, wherein the transfer of the portion of the network traffic comprises placing a communication link in standby mode.

3. The method of claim 1, wherein the network traffic exceeds the threshold based on a loss of connectivity along a communication link.

4. The method of claim 1, wherein the capacity information includes an available capacity and a used capacity of the network device, the identification of the excess capacity comprises subtracting the used capacity from the available capacity.

5. The method of claim 1, wherein the link aggregation protocol is a Link Aggregation Control Protocol.

6. Logic encoded in one or more non-transitory tangible media for execution and when executed operable to:
   receive capacity information from a network device, the capacity information identifying a network capacity of the network device;
   detect network traffic exceeding a threshold;
   identify an excess capacity of the network device based on the capacity information;
   transfer a portion of the network traffic to the network device by way of a, the portion of the network traffic being transferred based on the excess capacity;
   identifying an available capacity to handle additional network traffic; and
   broadcasting the available capacity to the network device by way of an Inter-Chassis Communication Protocol (ICCP).

7. The logic of claim 6, wherein the operation of transferring the portion of the network traffic, when executed, being further operable to raise a port priority value.

8. The logic of claim 6, further operable to receive an identifier of the network device.

9. The logic of claim 8, further operable to store the capacity information and the identifier in a routing database.

10. The logic of claim 6, wherein the link aggregation protocol is a multi-chassis Link Aggregation Control Protocol.

11. An apparatus comprising:
    at least one processor; and
    a machine-readable, non-transitory medium in communication with the at least one processor, the machine-readable, non-transitory medium being configured to store a communication link offload module, the communication link offload module being executed by the at least one processor cause operations to be performed, the operations comprising:
    receiving capacity information from a network device associated with a same redundancy group, the capacity information identifying a network capacity of the network device;
    detecting network traffic exceeding a threshold;
    identifying an excess capacity of the network device based on the capacity information;

transferring a portion of the network traffic to the network device by way of a link aggregation protocol, the portion of the network traffic being transferred based on the excess capacity;

identifying an available capacity to handle additional network traffic; and broadcasting the available capacity to the plurality of network devices associated with the same redundancy group by way of an Inter-Chassis Communication Protocol (ICCP).

12. The apparatus of claim 11, wherein the operations further comprise storing the capacity information in a routing database.

13. The apparatus of claim 11, wherein the capacity information includes an available bandwidth.

14. The apparatus of claim 11, wherein the capacity information includes a number of communication links with a loss of connectivity.

15. The apparatus of claim 11, wherein the threshold is an available capacity.

16. The apparatus of claim 11, wherein the apparatus is a provider edge routing device.

17. An apparatus comprising:

a communication link offload module to receive capacity information from a network device, the capacity information identifying a network capacity of the network device; to detect network traffic exceeding a threshold; and to identify an excess capacity of the network device based on the capacity information;

a means for transferring a portion of the network traffic to the network device by way of a link aggregation protocol, the portion of the network traffic being transferred based on the excess capacity; and means for identifying an available capacity to handle additional network traffic and for broadcasting the available capacity to the network device by way of an Inter-Chassis Communication Protocol (ICCP).

* * * * *

UNITED STATES PATENT AND TRADEMARK OFFICE
CERTIFICATE OF CORRECTION

PATENT NO. : 8,295,181 B2
APPLICATION NO. : 12/414425
DATED : October 23, 2012
INVENTOR(S) : Bradford et al.

It is certified that error appears in the above-identified patent and that said Letters Patent is hereby corrected as shown below:

In the Claims

In column 10, line 35, in claim 6, delete "a, the", insert --a link aggregation protocol, the"--, therefor In column 12, line 7, in claim 17, delete "device;" and insert --device,--, therefor In column 12, line 7, in claim 17, delete "threshold;" and insert --threshold,--, therefor Signed and Sealed this
Third Day of December, 2013

Margaret A. Focarino
*Commissioner for Patents of the United States Patent and Trademark Office*